United States Patent
Koeroghlian et al.

(10) Patent No.: US 8,714,189 B2
(45) Date of Patent: May 6, 2014

(54) FLOW VALVE

(75) Inventors: Mark Moses Koeroghlian, Austin, TX (US); Michael Merlyn Klein, Ann Arbor, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 472 days.

(21) Appl. No.: 13/005,619

(22) Filed: Jan. 13, 2011

(65) Prior Publication Data

US 2012/0181471 A1    Jul. 19, 2012

(51) Int. Cl.
*F16K 31/12* (2006.01)

(52) U.S. Cl.
USPC .............. 137/498; 137/517; 137/528; 251/65

(58) Field of Classification Search
USPC ......... 137/497, 498, 517, 529, 535, 537, 540, 137/859; 251/65
See application file for complete search history.

(56) References Cited

U.S. PATENT DOCUMENTS

| | | | |
|---|---|---|---|
| 2,569,316 A | 9/1951 | Jerman | |
| 2,756,773 A * | 7/1956 | Bauerlein | 137/895 |
| 3,675,171 A * | 7/1972 | Kirk | 335/232 |
| 4,128,105 A * | 12/1978 | Follett | 137/1 |
| 4,796,619 A * | 1/1989 | Walther | 128/204.19 |
| 4,874,012 A * | 10/1989 | Velie | 137/557 |
| 5,203,365 A | 4/1993 | Velie | |
| 5,209,454 A * | 5/1993 | Engdahl et al. | 251/65 |
| 6,250,331 B1 * | 6/2001 | Nardi | 137/517 |
| 6,923,206 B2 * | 8/2005 | Glover et al. | 137/517 |
| 7,255,323 B1 * | 8/2007 | Kadhim | 251/65 |
| 7,895,993 B2 * | 3/2011 | Weisz | 123/568.26 |
| 2003/0000580 A1 * | 1/2003 | Glover et al. | 137/517 |

OTHER PUBLICATIONS

Defintion of "Attached". Feb. 7, 2013.*

* cited by examiner

*Primary Examiner* — John K Fristoe, Jr.
*Assistant Examiner* — R. K. Arundale
(74) *Attorney, Agent, or Firm* — Carlson, Gaskey & Olds, P.C.

(57) ABSTRACT

A flow valve that may act as either an excess flow valve or a pressure relief valve has a seat and a valve body for sealing against the seat. The valve body has an integral spring arm for biasing the valve body towards or away from the seat to seal or open a flow of fluid, and a magnet cooperating with the spring arm to position the body relative to the seat to maintain the body in a first position during a normal flow condition and maintain the body in a second position in an abnormal flow condition.

11 Claims, 1 Drawing Sheet

FLOW VALVE

BACKGROUND OF THE INVENTION

Many fluid flow control devices, such as check valves, are spring or magnetically biased towards an open position. If a differential pressure exceeds a predetermined value, the valve is biased closed.

However, there are certain disadvantages in using spring biased devices like spring biased poppet-type check valves. The spring exerts increasing force against the flow as the poppet is closing and, thus, closing action is less positive and less reproducible.

Further, poppet valves and associated springs are relatively heavy, are adversely affected by gravity, and may be indifferently oriented relative to the direction of gravity forces, thereby making low flow pressure operating conditions difficult for proper operation.

Similarly, magnets that hold check valves may be required to be larger under certain operating conditions and may minimize the effective flow capacity of fluid flowing through a pipe.

SUMMARY OF THE INVENTION

According to an embodiment, a flow valve that may act as either an excess flow valve or a pressure relief valve has a seat and a valve body for sealing against the seat. The valve body has an integral spring arm for biasing the valve body towards or away from the seat to seal or open a flow of fluid, and a magnet cooperating with the spring arm to position the body relative to the seat to maintain the body in a first position during a normal flow condition and maintain the body in a second position in an abnormal flow condition.

These and other features of the present invention can be best understood from the following specification and drawings, the following of which is a brief description.

DETAILED DESCRIPTION OF THE PREFERRED EMBODIMENT

Figure 1:
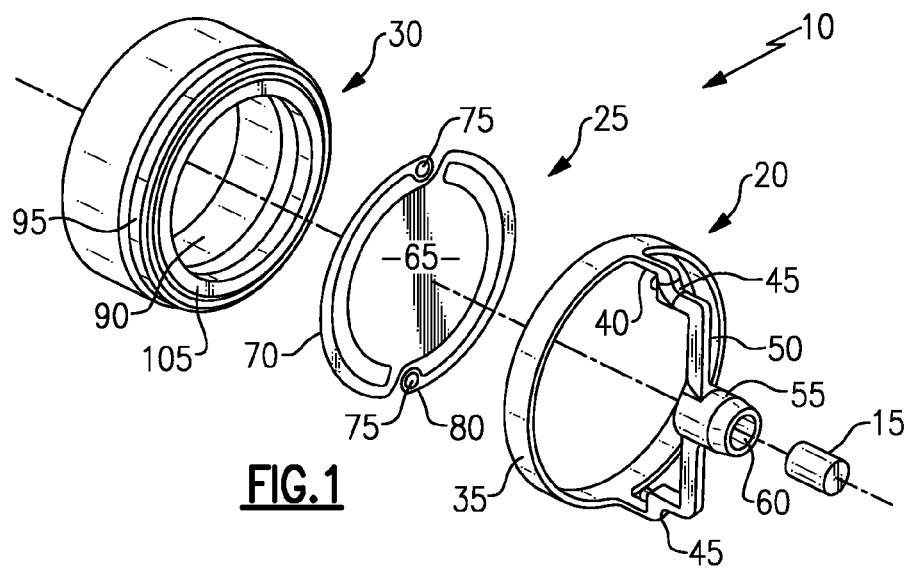
FIG. 1 is an exploded perspective view of a valve.
Figure 2:
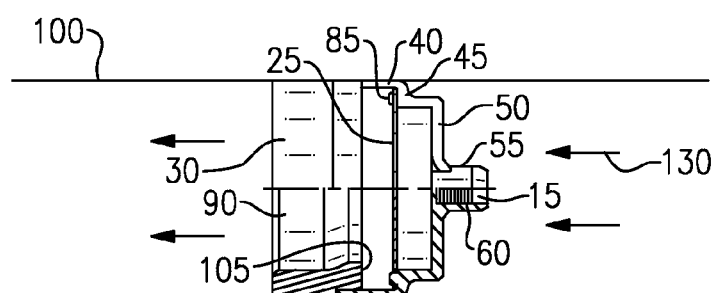
FIG. 2 is a side view of the valve of FIG. 1.

Referring now to FIGS. 1 and 2, an embodiment of the present valve 10 is shown. The valve consists of a magnet 15 having a cylindrical shape (other magnet shapes are contemplated herein), a magnet body 20, a valve plate 25, and a cartridge 30.

The magnet body 20 has a cylindrical, ring-like base 35, a pair of arms 40 extending from the cylindrical base, a pair of shoulders 45 attaching to the arms 40, and a pair of transverse supports 50 connecting to the shoulders 45 and holding a cylindrical body 55 having a bore 60 therethrough. The bore 60 holds the magnet 15 securely therein by friction fit or otherwise.

The valve plate 25 has a body 65 that is flat and cylindrical (though other shapes are contemplated herein) from which a pair of spring arms 70 extend outwardly and then there around the body. Each spring arm has an opening 75 at a distal end 80 thereof. Each opening 75 is placed over a stake 85 disposed in the shoulder 45 of the magnet body 20 to secure the valve plate 25 to the magnet body 20. After placing the spring arms 70 on the magnet body, the stakes 85 are melted to secure the valve plate 25 on the magnet body.

The cartridge 30 has an inner bore 90 through which fluid flows and an outer shoulder 95 upon which the cylindrical base 35 of the magnet body 20 is disposed. The cylindrical base 35 and the cartridge 30 are dimensioned to fit securely within a vessel such as a pipe 100, or the like, through which fluid flows. The cartridge has a seat or face 105 over which the body 65 is designed to rest to impede flow through the cartridge 30. One of ordinary skill in the art will recognize that the cartridge 30 may be integral with a pipe.

The magnet body 20 and the cartridge 30 may be constructed of a suitable material such as plastic or metal. Similarly, the valve plate 25 may be constructed of a light, hard material that is attracted to magnets.

Figure 3:
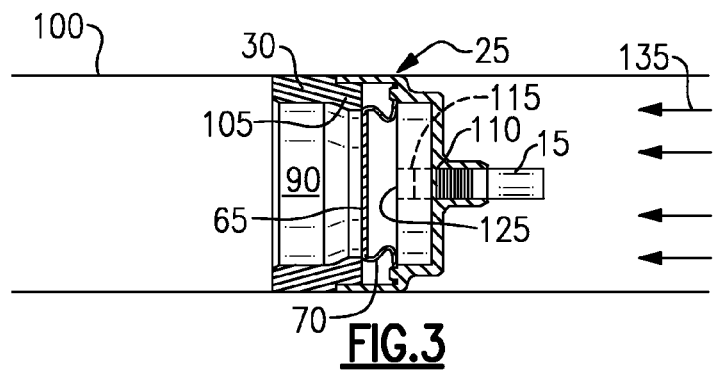
FIG. 3 is a side view of the valve of FIG. 1 and a first operating condition.

In operation and referring to FIG. 3, the magnet may be in one or several positions within the magnet body, e.g., parallel 110 to supports 50, between 115 the supports 50 and the valve plate 25, or touching 120 the body 65 or other positions depending on the requirements of the valve 10.

During normal operation indicated by normal flow arrows 125, the body 65 is static. If there is such a condition to create excess flow through the pipe 100, the excess flow forces (arrows 135 in FIGS. 3 and 4), the body 35 is pushed away from the forces of the magnet 15 against the spring forces of spring arms 70 towards the cartridge 30 to seat against the face 105 thereby cut off flow through the pipe. As the body 65 is pushed towards the face, the spring arms 70 thereon deform and create a force pulling the plate away from the face 105 so that if the excess flow condition 135 abates the springs will pull, in conjunction with the magnet 15, the body 65 back to allow regular flow there through. To vary the time required to allow the body 65 to move away from the face 105 in the cartridge 30, the magnet 15 may be placed at within the bore 60 as desired.

The tension of the spring arms and the force of the magnet combine to allow a user to design a valve 10 for particular flow requirements. For instance, if the magnet is closer to the body 65, the attractive force is greater and the body 65 will move away from the face 105 with higher pressure against it. Similarly, moving the magnet away will provide less force on the body 65 and lower pressures are required to bias the spring arms away from a static position. Also, if the spring arms 70 are made stronger, more pressure may be required to move the body 65 towards the face 105. If the spring arms 70 are made weaker, less pressure may be required to move the body 65 towards the face 105. A user may then vary the strength of the spring arms and the placement and strength of the magnet to tune a valve for the particular results required.

Figure 4:
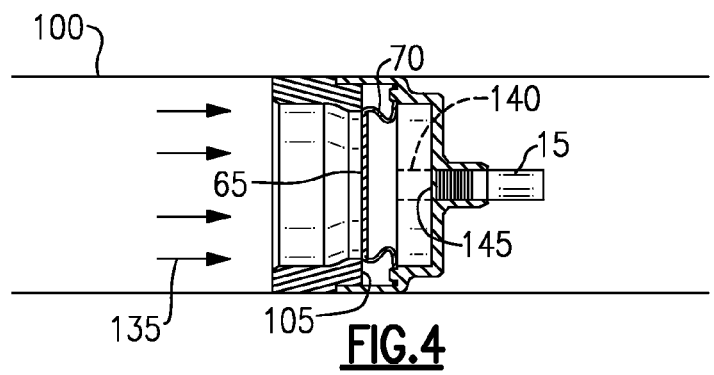
FIG. 4 is a side view of the valve of FIG. 1 and a second operating condition.

Referring to FIG. 4, the valve 10 may be utilized as a pressure relief valve. In this Figure, the body 65 and its integral spring arms 70 are biased away from the face 105. The magnet 15, as above may be placed in several positions 140, 145 depending on requirements of the valve. Because the valve plate is biased towards the seat, the valve will not move away from the plate unless an excess flow condition pushes the valve away as shown by solid lines. By allowing the magnet to have several different positions within the magnet body, one can tune the valve to work with different pressures.

For instance, if the magnet is closer to the body 65, the attractive force is greater and the body 65 will move away from the face 105 with lesser pressure against it. Similarly, moving the magnet away will provide less force on the body 65 and higher pressures are required to bias the spring arms away from a static position. Also, if the spring arms 70 are made stronger, more pressure may be required to move the body 65 away from the face 105. If the spring arms 70 are made weaker, less pressure may be required to move the body 65 away from the face 105. A user may then vary the strength of the spring arms and the placement and strength of the magnet to tune a valve for the particular results required. As such, this valve and magnet arrangement can be used for excess flow or pressure relief depending on the means of an operator.

By utilizing a combination of a spring arms 70 and a magnet 15, the cooperating forces thereof allow for the design envelope to increase flow capacity without affecting the closing flow of fluid through the valve 10.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A valve regulating a flow of fluid therethrough, said valve comprising:
   a seat,
   a body for sealing against said seat, said body having
   a spring arm integral therewith for biasing said body towards or away from said seat to seal or open a flow of fluid,
   a magnet for cooperating with said spring arm to position said body relative to said seat to maintain said body in a first position during a normal flow condition and maintain said body in a second position in an abnormal flow condition, wherein said abnormal flow condition is an elevated flow condition relative to said normal flow condition, wherein the magnet is moveable between at least a first position and a second position, and wherein the valve has a first closing force when the magnet is in the first position and a second closing force distinct from said first closing force when the magnet is in the second position.

2. The valve of claim 1 further comprising;
   a cartridge for being disposed in a fluid flow said cartridge defining said seat for cooperating with said body.

3. The valve of claim 1 further comprising;
   a structure for holding said magnet relatively central to said body.

4. The valve of claim 3 further comprising;
   a cartridge for being disposed in a fluid flow said cartridge defining said seat for cooperating with said body, said structure impinging upon said cartridge.

5. The valve of claim 4 wherein said structure has a ring-like base and said cartridge has a cut-out for receiving said ring-like base.

6. The valve of claim 3 wherein said body is attached to said structure.

7. The valve of claim 6 wherein said spring arm of said body is attached to said structure.

8. The valve of claim 1 wherein when in a said first position, said spring arm is biased away from said face to keep said body away from said seat.

9. The valve of claim 8 wherein when in said second position said spring arm is biased towards said face and said body is against from said seat.

10. The valve of claim 9 wherein an abnormal flow of air moves said body into said second position.

11. The valve of claim 1 wherein when said abnormal flow of air ceases, said spring arm and said magnet moves said body into said first position.

\* \* \* \* \*